United States Patent [19]

Zscheile, Jr. et al.

[11] Patent Number: 4,809,295
[45] Date of Patent: Feb. 28, 1989

[54] CODE LENGTHENING SYSTEM

[75] Inventors: John W. Zscheile, Jr., Farmington; Alan E. Lundquist, Salt Lake City; Bellie M. Spencer, Bountiful, all of Utah

[73] Assignee: Unisys Corporation, Blue Bell, Pa.

[21] Appl. No.: 40,526

[22] Filed: Apr. 20, 1987

[51] Int. Cl.$^4$ .......................................... H04L 9/04
[52] U.S. Cl. ..................................... 375/1; 380/34; 380/46; 380/47
[58] Field of Search .............. 375/1; 380/34, 46, 47; 364/717

[56] References Cited

U.S. PATENT DOCUMENTS

| 3,728,529 | 4/1973 | Kartchner et al. | 364/717 |
| 4,225,935 | 9/1980 | Zscheile, Jr. et al. | 375/1 |
| 4,308,617 | 12/1981 | German, Jr. | 375/1 |
| 4,418,393 | 11/1983 | Zscheile, Jr. | 375/1 |
| 4,667,301 | 5/1987 | Chiv et al. | 364/717 |
| 4,685,132 | 8/1987 | Bishop et al. | 380/46 |
| 4,688,251 | 8/1987 | Citron et al. | 380/34 |
| 4,755,987 | 7/1988 | Lee et al. | 375/1 |
| 4,776,012 | 10/1988 | Zscheile, Jr. et al. | 375/1 |

Primary Examiner—Salvatore Cangialosi
Attorney, Agent, or Firm—John B. Sowell; Kevin R. Peterson; Thomas J. Scott

[57] ABSTRACT

Apparatus and a method of generating very very long pseudonoise (PN) spread spectrum codes is provided where the code is so long that it need never repeat itself during actual use. The transmitter is adapted to start to transmit one set of a plurality of component codes as a composite code having correlation properties with the component codes. When the first set of component codes are acquired at the receiver the composite code is then transmitted as a component of a different composite code which contains the previous composite code and a second new set of component codes which have correlation properties with the new set of component codes. When the second set of component codes are acquired by the receiver the composite code is then transmitted as a third new and different composite code which contains a third new set of component codes which have correlation properties with third new set of component codes. When the third new set of component set of codes is required the transmitter is already transmitting a very very long composite code but may lengthen the composite code by employing further set of component codes or may continue to transmit the very very long composite code without having any correlation properties with any of the component codes being transmitted.

8 Claims, 3 Drawing Sheets

CODE LENGTHENING SYSTEM

BACKGROUND OF THE INVENTION

1. Field of the Invention

This invention relates generally to pseudonoise (PN) spread spectrum communication systems, and, more particularly, to apparatus and a method for generating very long composite PN codes and a method and apparatus for minimizing the time of acquisition of such very long composite codes.

2. Description of the Prior Art

The present invention may be considered to be an improvement of our U.S. Pat. No. 4,225,935. The system referenced therein combines individual PN component codes to provide a PN composite code having a code length equal to the product of the individual PN component code lengths.

The advantage in creating a composite PN code from individual component PN codes is during acquisition. The system of acquisition permits the acquisition of the first, which is usually the shortest, PN component code first. After lock-on employing code locked loops the next, which is usually the next shortest, PN component code is acquired. Thus, sequentially each of the PN component codes may be acquired until all PN component codes are acquired so as to reproduce the PN composite code.

While our previous U.S. Pat. No. 4,225,935 discloses and teaches that more than three PN component code generators may be employed in a practical PN composite code generator, theoretically the number of code generators is limited. The number of input PN code generators is limited by two factors. First, when there are three PN component code generators, the full power signal available at the receiver is not available during acquisition. It is only after acquisition and lock-on of all three component codes that the full power of the composite code is available for tracking and lock-on. For three PN component code generators, only one-half of the voltage of the receiver signal is available, thus, only one-fourth the power. This equates to a 6 dB loss and severely limits the expansion of the component PN code system beyond three. For example, it can be shown that when five component PN code generators are employed, the power is only 1/16th and the power loss attenuation has increased by a factor of 4 or is now down 12 dB.

Secondly, in our previous system it was explained that the output of the majority vote combiner (MAJ) possesses correlation component properties wherein the individual PN component codes $C_1$, $C_2$ and $C_3$ each correlate with the MAJ ($C_1$, $C_2$, $C_3$) composite code with a 50% correlation factor and that a composite code derived by a modulo two addition combining rule (MOD) has no correlation with the individual PN component codes.

The significance of this characteristic of MAJ and MOD composite codes is important in that while the composite code is a MAJ code it is more easily acquired by those who already know the component codes. However, it is also more easily acquired or deciphered by unfriendly forces who are reconstructing the component codes. The longer the transmitted signal is in the MAJ mode the more easily it is that it may be intercepted.

It would be extremely desirable to provide a PN composite code of any desired length without limitation which has no greater power loss during acquisition than if the code had been derived from three PN component code generators, and does not inordinately increase the acquisition time of the very long code and yet does not create a composite code more susceptible to interception.

SUMMARY OF THE INVENTION

It is a principal object of the present invention to provide a method and apparatus for producing a PN composite code so long that it never repeats itself during use.

It is a principal object of the present invention to provide apparatus and method for acquiring a PN composite code so long that it never repeats itself during use.

It is yet another principal object of the present invention to provide a very long composite code which has no greater power signal loss during acquisition than a composite code of much shorter length.

It is another object of the present invention to be able to create very long composite codes from a large number of individual PN component code generators without creating additional power signal losses during acquisition.

It is yet another object of the present invention to provide apparatus and a method of acquiring very long composite PN codes wherein the time of acquisition of such codes is only increased in proportion to the number of PN component code generators employed and not the length of the PN composite code.

It is another object of the present invention to provide a method and apparatus for producing very long PN composite codes which cannot be acquired by unfriendly forces without acquiring each and every PN component code in the composite code.

It is a general object of the present invention to provide a method and apparatus for producing PN composite codes of near infinite length which can be acquired within a reasonable time.

According to these and other objects of the present invention there is provided a transmitter for transmitting MAJ signals containing a first plurality of PN component codes which responds to an acquisition signal and then only transmits the MOD of the first plurality of PN component codes. The transmitter then sends the MAJ of a second plurality of PN component codes combined with the MOD of the first plurality of PN component codes until a second acknowledgement acquisition signal is received. Then the transmitter only transmits the MOD of the first and the second plurality of PN component codes. The transmitter then sends the MAJ of the third plurality of PN component codes combined with the MOD of the first and second plurality of PN component codes until a third acknowledgement acquisition signal is received ad infinitum until the last plurality of individual PN component codes is acquired at the receiver at which time the acknowledgement signal received at the transmitter causes the transmitter to only send the MOD of all of the individual PN component codes.

DETAILED DESCRIPTION OF THE PREFERRED EMBODIMENT

Before explaining in detail the operation of the drawings, the terminology to be employed in this application has been employed in prior art references such as our U.S. Pat. No. 4,225,935 and U.S. Pat. No. 3,728,529, assigned to the same assignor as this Application, and also in references cited in these patents.

Figure 1:
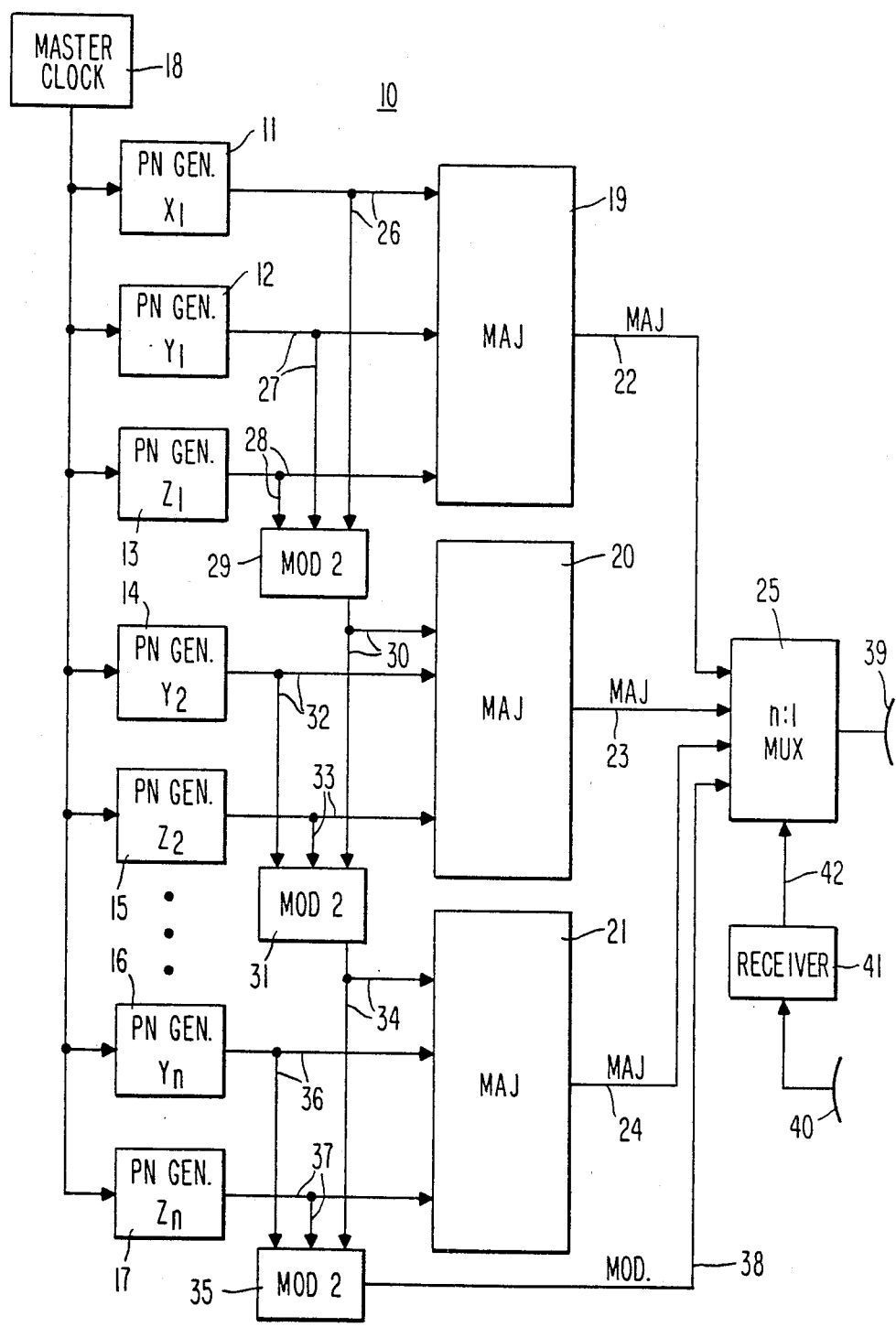
FIG. 1 is a schematic block diagram of the transmitting portion of the present invention.

Refer now to FIG. 1 showing the transmitter portion of the preferred embodiment of the present invention. Transmitter 10 comprises a plurality of individual PN component code generators 11 through 17. For purposes of aiding and explaining the present invention these PN generators have also been given alphabetic designations indicative of the code produced by the individual generators such as $X_1$, $Y_1$, $Z_1$ and $Y_n$ and $Z_n$. It will be understood that there is a first plurality of PN generators comprising three individual PN generators $X_1$, $Y_1$ and $Z_1$ and there are additional pluralities of PN generators comprising pairs of PN generators which can be added in infinite numbers of pairs. A master clock 18 is shown driving each of the individual PN code generators so that the outputs thereof are completely synchronized for purposes of generating composite codes. The first plurality of PN generators 11 through 13 are shown having their outputs coupled to the input of the majority vote combiner (MAJ) 19. In similar fashion the second and third plurality of PN code generators 14, 15 and 16, 17 are shown having their outputs coupled to the input of MAJ combiners 20 and 21 respectively. The output of MAJ combiners 19, 20 and 21 on output lines 22, 23 and 24 are shown coupled to the input of multiplexer 25. The outputs of the PN generators 11, 12, 13 on lines 26, 27 and 28 are shown applied to the input of modulo two combiner 29 to produce a composite code output on lines 30 which is a complement code input to MAJ combiner 20 and also as a component code input to modulo two combiner 31. The outputs of the second plurality of PN generators 14, 15 are applied as inputs via lines 32 and 33 to a second modulo two combiner 31 to produce a composite PN code on output line 34. The composite code on line 34 is applied to the third MAJ combiner 21 and also is applied as an input to the third modulo two combiner 35 via line 34. The output from the third plurality of PN code generators 16, 17 are also applied via lines 36, 37 to the third modulo two combiner 35 to produce a composite code on output line 38 which is a modulo two combination of all of the component codes from component generators 11 through 17.

Figure 2:
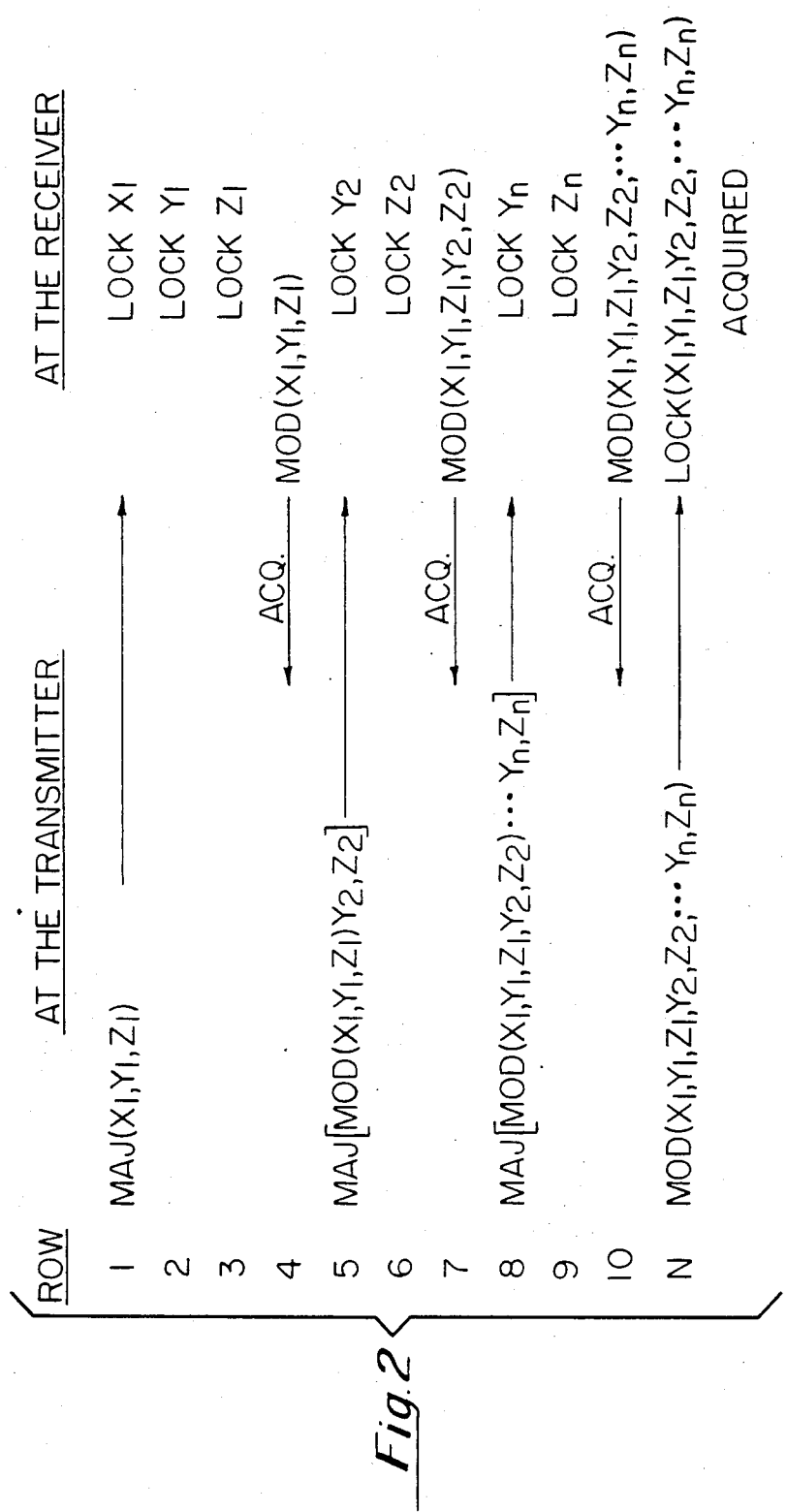
FIG. 2 is a table showing the time sequence of operation at the transmitter and receiver during acquisition of the composite code.

For purposes of explaining the time sequence of operation of the transmitter shown in FIG. 1 also refer now to FIG. 2. There are two columns shown in FIG. 2. The first column describes operations occurring at the transmitter. The second or right hand column describes operations occurring at the receiver and will be explained in greater detail hereinafter with respect to FIG. 3. The first row or operation shows the MAJ combination of codes $X_1$, $Y_1$, and $Z_1$ being transmitted via antenna 39 to the receiver of FIG. 3. The MUX 25 has connected the output line 22 through to antenna 39 and the MAJ of ($X_1$, $Y_1$, $Z_1$) is transmitted to the receiver where it first locks on to $X_1$, then sequentially $Y_1$ and then sequentially $Z_1$. The fourth row in FIG. 2 shows that the receiver has switched to the MOD of ($X_1$, $Y_1$ and $Z_1$) after having already acquired the individual components. An acquisition signal is transmitted from the receiver back to receiving antenna 40 in the transmitting station and the receiver acknowledgement acquisition signal is processed in receiver 41 and MUX 25 via line 42. Upon receipt of the acknowledgement signal MUX 25 switches to MAJ combiner 20 and starts to transmit via antenna 39 the output of MAJ combiner 20 on line 23. Row 5 of FIG. 2 shows the condition of the transmitter is now producing the MAJ of MOD ($X_1$, $Y_1$, $Z_1$) and the MAJ of the individual component codes $Y_2$ and $Z_2$ from PN generators 14 and 15. This signal contains correlation properties unique to the component codes $Y_2$ and $Z_2$ being produced at PN code generators 14 and 15 as well as similar generators at the receiver of FIG. 3. After the receiver locks on to the two individual $Y_2$ and $Z_2$ component codes from PN generators 14 and 15 it switches to the MOD of the five individual PN generators 11 through 15 which are producing codes $X_1$, $Y_1$, $Z_1$, $Y_2$, and $Z_2$ as shown at row 7 of FIG. 2. The receiver of FIG. 3 produces an acquisition signal acknowledging that it has acquired codes $Y_2$ and $Z_2$ which is received at antenna 40 in transmitter 10 and is processed in receiver 41 to produce the acknowledge acquisition signal on line 42 that causes the MUX 25 to now shift to line 24 which is the output of MAJ combiner 21.

Row 8 of FIG. 2 shows that the output from modulo two combiner 31 on line 34 is treated as a component code and combined with the component code outputs of PN generators 16 and 17 shown designated as $Y_n$ and $Z_n$. Once the receiver locks on to the output of the last plurality of PN code generators 16 and 17, it produces a MOD signal at the receiver of FIG. 3 and also produces an acquisition acknowledgment signal on row 10 that all of the individual PN code generators have been acquired which enables the transmitter to now shift the MUX 25 to line 38 and transmit the MOD of all of the individual PN codes being produced at the PN generators 11 through 17 via line 38 on row N. Thus, the last row N of FIG. 2 shows that the transmitter is producing a MOD of the codes of all of the individual PN generators which is not limited to the generators 11 to 17 shown. Additional pairs of generators $X_n$, $Y_n$ may be added to produce composite PN codes which are the MOD of any number of PN generating codes which has no correlation factor with the individual PN component codes.

Figure 3:
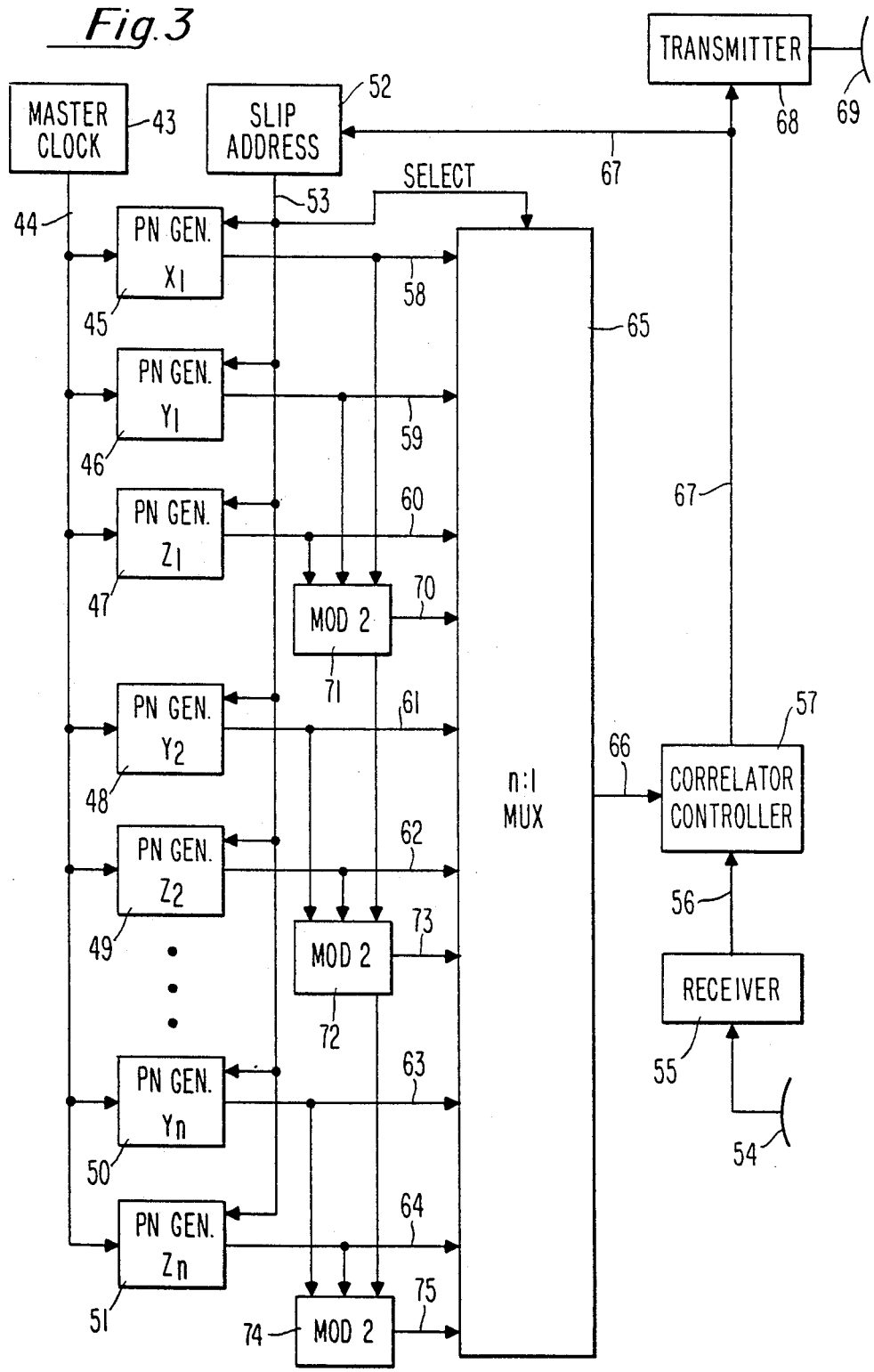
FIG. 3 is schematic block diagram of the receiving portion of the present invention.

Refer now to FIG. 3 showing a schematic block diagram of the preferred embodiment receiver. The receiver system comprises a master clock 43 which produces the chip rate clock signal on line 44 that is applied to the individual PN generators 45 through 51 having PN codes identical to those PN generators 11 through 17 in the transmitter of FIG. 1. In order to acquire a code and to lock on to the code being received, the PN generators must be slipped in time by slowing down or speeding up clock signals until a correlation with the transmitted signal occurs as is well known in this art. The slip address generator 52 sequentially applies selection signals on bus 53 to the individual PN code generators 45 to 51 as their outputs sequentially locked onto the PN code signals being received at antenna 54. The received signals are processed at receiver 55 and applied via line 56 to the correlator controller 57.

Each of the PN generators 45 to 51 is shown having an output line 58 to 64 connected to the multiplexer 65. The multiplexer initially selects PN generator 45 for acquisition and for correlation comparison to the received signal. The PN generator signal on line 58 is applied by MUX 65 and line 66 to the correlator controller 57 during which time the slip address generator 52 is commanding PN generator 45 to slip its code. Once correlation is achieved at correlator controller 57 the output signal on line 67 is fed back to the slip address generator 52 to cause a slip address generator to now select the second PN generator 46 for slipping and for correlation. Once the second PN generator 46 has achieved correlation the output signal on line 67 causes the slip address generator 52 to now select the third PN generator 47 and to shift the multiplexer 65 to the output line 60 so that correlator controller 57 compares the signal from generator 47. Once PN generator 47 is locked onto the MAJ of the incoming signal, the correlator controller 57 produces a signal on line 67 indicating that the first plurality of PN generators 45 through 47 have been acquired and are locked on. This causes the slip address generator 52 to shift the multiplexer to output line 70 of the modulo two combiner 71. If the correlator 57 can confirm that the MOD of generators 45 to 47 is correlated with the MAJ of the same coded received signal, then the correlator controller 57 can send out an acknowledgement signal on line 67 that the MAJ of the first plurality of PN code generators has been acquired.

As previously explained and shown in FIG. 2 the transmitter now transmits the MAJ of the MOD of the first plurality of component code generators combined with the second plurality of individual component codes being produced at generators 14 and 15. The acquisition acknowledgement signal on line 67 in addition to being transmitted to the transmitter of FIG. 1 also causes the slip address generator 52 to select PN generator 48 for attempted acquisition of PN code $Y_2$. Once the $Y_2$ code of generator 48 on line 61 is acquired, the correlator 57 sends out a signal on line 67 causing the slip address generator 52 to shift its select signal to PN generator 49 and to shift the MUX to its input line 62. Once the second plurality of individual component codes $Y_2$, $Z_2$ is acquired, the correlator controller 57 again by action of the slip address generator 52 causes the MUX 65 to select the output of modulo two combiner 72 on line 73 for comparison with the MAJ of the $Y_2$, $Z_2$ codes being produced by PN generators 14 and 15 at transmitter 10. If the correlator 57 confirms that the MOD of the second plurality of code generators matches the MAJ of the second plurality of code generators being transmitted, then the correlator controller 57 sends out an acknowledgement acquisition signal on line 67 which is transmitted via transmitting antenna 69 to the receiving antenna 40 of the transmitter 10. The transmitter 10 transmits the MAJ of the modulo two combination of the first two pluralities of PN generators combined with the third plurality of PN generators 16 and 17, that is MAJ [MOD ($X_1$, $Y_1$, $Z_1$, $Y_2$, $Z_2$) $Y_n$, $Z_n$]. The acknowledgement signal on line 67 also causes the slip address generator 52 to shift the MUX to its input line 63 and to start slipping the PN code $Y_n$ for purposes of acquisition. Once code $Y_n$ is acquired correlator controller 57 and slip address generator 52 cause the multiplexer to select input line 64 and to attempt acquisition of code $Z_n$ being received at the correlator 57 from the transmitter 10. Once acquisition of the last PN code $Z_n$ is acquired, the acquisition signal on line 67 again causes the slip address generator 52 to shift the MUX to modulo two combiner 74 which is the MOD of all of the individual PN codes and is applied on output line 75 to multiplexer 65. If the correlator now confirms that the received signal correlates with the modulo two combination of all of the individual PN generators 45 to 51, a final acquisition acknowledgement signal on line 67 is transmitted via antenna 69 to the receiving antenna 40 of transmitter 10 which enables the transmitter to now select the MOD of all of the individual PN generators for transmission to the receiver of FIG. 3. Once the transmitter shifts to the MOD of all of the PN generators in the transmitter it may now lock onto the MOD of all of the PN generators 45 to 51 in the receiver of FIG. 3. At this time acquisition is complete and the receiver has full tracking correlation with the incoming signal.

Having explained a preferred embodiment of the present invention it will be understood that the receiver initially is attempting to correlate with the code of three individual PN code generators and that when the receiver is attempting to correlate with the second plurality of PN generators that the received signal appears as a three component majority vote (MAJ) signal and not a five majority vote signal as was attempted in the prior art. Thus, the power attenuation loss at the receiver is no greater than 6 dB as opposed to 12 dB in the prior art when five component codes were being transmitted for correlation. Further, it will be appreciated that once acquisition of the first plurality of PN codes is achieved, the transmitter is sending the MOD of the first plurality of codes and it is impossible for an interceptor to attempt to correlate with the first plurality of component codes. The situation becomes increasingly complex to an interceptor once the second plurality of component codes are acquired and the transmitter transmits the MOD of the first and second plurality of component codes which contains no correlation factor for the interceptor to attempt to decipher.

In the preferred embodiment described, the first plurality of PN code generators include three component code generators and the additional pluralities include two component code generators. The number of code generators is selected to accommodate the majority combining rule which is simplified when an odd number of code generators is employed. When the MAJ of the MOD of a composite code is transmitted, it is effectively only one component code. When the second plurality of codes is added, the MAJ code them comprises three components. The invention is operable at less efficiency when the majority combining rule is altered for larger or smaller groups of code generators.

It will also be appreciated that the acquisition time of the composite code is a function of the sum of the acquisition times of the individual PN codes yet the length of the composite PN code is the product of the length of the individual PN codes. It is now possible employing the present invention to create composite codes of such length that they never repeat themselves during practical use.

What we claim is:

1. A method of transmitting and rapidly acquiring substantially non-repeating pseudonoise (PN) spread spectrum codes, comprising the steps of:

transmitting a first composite code comprising a first plurality of individual component codes $X_1$, $Y_1$, $Z_1$ having correlation properties with the component codes, sequentially acquiring each of the component codes $X_1$, $Y_1$, $Z_1$ until the composite code having correlation properties with the first plurality of component codes is acquired, transmitting a second composite code comprising a second plurality of individual component codes $Y_2$, $Z_2$ and the composite of said first plurality of individual component codes treated as a component code where said second composite code has correlation properties with said individual component codes $Y_2$ and $Z_2$, sequentially acquiring each of said component codes $Y_2$ and $Z_2$ until the composite code being transmitted is acquired, transmitting $n^{th}$ composite code comprising a $n^{th}$ plurality individual component codes $Y_n$, $Z_n$ and the composite of said first and said second plurality of individual component codes treated as a component code where said $n^{th}$ composite code has correlation properties with said individual component codes $Y_n$ and $Z_n$, and sequentially acquiring each of said component codes $Y_n$ and $Z_n$ until the modulo two (MOD) composite code MOD ($X_1$, $Y_1$, $Z_1$, $Y_2$, $Z_2$, $Y_n$, $Z_n$) which comprises the substantially non-repeating composite code is acquired.

2. A method of transmitting and rapidly acquiring substantially non-repeating pseudonoise (PN) codes as set forth in claim 1 which further includes the steps of transmitting additional numbers of pluralities of composite codes comprising individual component codes $Y_{n+1}$, $Z_{n+1}$ and the composite of said previous transmitted component codes treated as a component code where the composite code always has correlation properties with said individual component codes $Y_{n+1}$, $Z_{n+1}$, and sequentially acquiring each of said component codes $Y_n$ and $Z_n$ until the component code MOD ($X_1$, $Y_1$, $Z_1$, $Y_2$, $Z_2$, Yn, $Z_n$—$Y_{n+1}$, $Z_{n+1}$) is acquired.

3. A method of transmitting and rapidly acquiring substantially non-repeating pseudonoise (PN) codes as set forth in claim 1 which further includes the steps of:

after acquiring each plurality of component codes then acknowledging that acquisition of the code being transmitted has been achieved to enable the transmitter to further expand the composite code by adding new component codes.

4. A method of transmitting and rapidly acquiring substantially non-repeating pseudonoise (PN) codes as set forth in claim 3 wherein the step of initially transmitting the composite code having correlation properties is a majority vote (MAJ) composite of the component codes, and after the step of acknowledging acquisition of each plurality of component codes the step of transmitting the acquired component codes is a modulo two (MOD) composite of the component codes acquired which has no correlation properties to the acquired plurality of component codes.

5. A method of transmitting and rapidly acquiring substantially non-repeating pseudonoise (PN) codes as set forth in claim 4 wherein the step of acknowledging that the acquisition has been achieved further comprises locking onto the majority vote (MAJ) composite code being transmitted with a modulo two (MOD) replica composite code and then acknowledging locked-on acquisition.

6. A system for generating substantially non-repeating pseudonoise (PN) codes capable of rapid of acquisition, comprising:

a transmitter, a multiplexer in the transmitter, a first majority vote (MAJ) composite code generator connected to a first plurality of component code generators $X_1$, $Y_1$ and $Z_1$ for producing at the input of said multiplexer a composite code MAJ ($X_1$, $Y_1$, $Z_1$), a first modulo two (MOD) composite code generator connected to said first plurality of component code generators ($X_1$, $Y_1$ and $Z_1$) for producing at its output a composite code MOD ($X_1$, $Y_1$ and $Z_1$), a second majority vote (MAJ) composite code generator connected to a second plurality of component code generators $Y_2$ and $Z_2$ and to the output of the said first modulo two composite code generator for producing at the input of said multiplexer a composite code MAJ [MOD($X_1$, $Y_1$, $Z_1$), $Y_2$, $Z_2$], a second modulo two (MOD) composite code generator connected to said second plurality of component code generators $Y_2$ and $Z_2$ and to the output of said first modulo two (MOD) composite code generator for producing at its output the composite code MOD ($X_1$, $Y_1$, $Z_1$, $Y_2$, $Z_2$), an $n^{th}$ majority vote (MAJ) composite code generator connected to an $n^{th}$ plurality of component code generators $Y_n$ and $Z_n$ and to the output of said $n-1^{th}$ modulo two (MOD) composite code generator for producing at the input of said multiplexer a composite code MAJ [MOD($X_1$, $Y_1$, $Z_1$, $Y_2$, $Z_2$,—), $Y_n$, $Z_n$], an $n^{th}$ modulo two (MOD) composite code generator connected to said $n^{th}$ plurality of component code generators $Y_n$, $Z_n$ and to the output of the $n-1^{th}$ modulo two (MOD) composite code generator for producing at its output and at the input of said multiplexer a composite code MOD ($X_1$, $Y_1$, $Z_1$, $Y_2$, $Z_2$, —$Y_n$, $Z_n$) which includes the MOD of all component code generators, a transmitter antenna coupled to the output of said multiplexer, and selector means coupled to said multiplexer for initially selecting the output of said first majority vote composite code generator for transmission enabling acquisition of the component codes $X_1$, $Y_1$, and $Z_1$ and for sequentially switching to said second and then said third majority vote composite code generators and then to said $n^{th}$ modulo two composite code generator to enable acquisition of the remaining component codes $Y_2$, $Z_2$ and $Y_n$ and $Z_n$ before transmitting the MOD of all component code generators MOD ($X_1$, $Y_1$, $Z_1$, $Y_2$, $Z_2$—$Y_n$, $Z_n$).

7. A system for generating substantially non-repeating PN codes as set forth in claim 6 wherein each of said component code generators and said composite code generator are PN code generators.

8. A system for generating substantially non-repeating PN codes as set forth in claim 6 which further comprises a receiver having:

a multiplexer, a replica code generator for each component code being transmitted and a composite replica code generator for each modulo two code generator in said transmitter connected to said multiplexer, and a slip address generator coupled to said component code generators and to said multiplexer for sequencing said multiplexer from the individual replica component code generators $X_1$, $Y_1$, $Z_1$, $Y_2$, $Z_2$—$Y_n$, $Z_n$ as acquisition and locked-on of the individual component codes is achieved until the receiver is locked-on to the composite code of all component codes.

* * * * *